US 11,523,132 B2

United States Patent
Sogabe et al.

(10) Patent No.: US 11,523,132 B2
(45) Date of Patent: Dec. 6, 2022

(54) PREDICTION IMAGE ACQUISITION APPARATUS, ORIGINAL SIGNAL ACQUISITION APPARATUS, PREDICTION IMAGE ACQUISITION METHOD AND PROGRAM

(71) Applicant: NIPPON TELEGRAPH AND TELEPHONE CORPORATION, Tokyo (JP)

(72) Inventors: Yoko Sogabe, Musashino (JP); Shiori Sugimoto, Musashino (JP); Seishi Takamura, Musashino (JP); Atsushi Shimizu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/291,394

(22) PCT Filed: Nov. 7, 2019

(86) PCT No.: PCT/JP2019/043593
§ 371 (c)(1),
(2) Date: May 5, 2021

(87) PCT Pub. No.: WO2020/100701
PCT Pub. Date: May 22, 2020

(65) Prior Publication Data
US 2022/0007049 A1  Jan. 6, 2022

(30) Foreign Application Priority Data
Nov. 14, 2018 (JP) .............................. JP2018-213790

(51) Int. Cl.
*H04N 19/577* (2014.01)
*H04N 19/105* (2014.01)
*H04N 19/182* (2014.01)

(52) U.S. Cl.
CPC ......... *H04N 19/577* (2014.11); *H04N 19/105* (2014.11); *H04N 19/182* (2014.11)

(58) Field of Classification Search
CPC .................................................. H04N 19/577
(Continued)

(56) References Cited

U.S. PATENT DOCUMENTS 8,111,754 B1 * 2/2012 Demos ................... H04N 19/61
   382/236
9,313,493 B1 * 4/2016 Maaninen ............ H04N 19/176
(Continued)

FOREIGN PATENT DOCUMENTS

JP   2014131210 A   7/2014

OTHER PUBLICATIONS

Emmanuel J. Candès and Michael B. Wakin, an introduction to compressive sampling, IEEE signal processing magazine, vol. 25, No. 2, 2008, pp. 21-30.
Thong T. Do et al., Distributed compressed video sensing, Information Sciences and Systems, 2009, pp. 1-2.
(Continued)

*Primary Examiner* — Yulin Sun
(74) *Attorney, Agent, or Firm* — Harness, Dickey & Pierce, P.L.C.

(57) ABSTRACT

A predictive image acquisition device is a predictive image acquisition device for associating an observation signal, the observation signal being a signal obtained from an original image serving as a decoding target image and being a lower dimensional signal than the original image, a first predictive image having a high correlation with the original image, and
(Continued)

a second predictive image having a high correlation with the original image with each other to obtain a combined predictive image, and includes an interpolation factor acquisition unit configured to obtain an interpolation factor set for each pixel of the combined predictive image from the first predictive image, the second predictive image, and the observation signal, and a combined predictive image acquisition unit configured to combine the first predictive image and the second predictive image for each pixel using the interpolation factor to obtain the combined predictive image, and the pixels constituting the observation signal are expressed by a linear sum of the original image.

6 Claims, 6 Drawing Sheets

(58) Field of Classification Search
USPC .................................................. 375/240.15
See application file for complete search history.

(56) References Cited

U.S. PATENT DOCUMENTS

2011/0181760 A1\* 7/2011 Horie ................. H04N 9/04557
348/E9.037
2015/0172618 A1\* 6/2015 Takahashi .......... H04N 9/04555
348/164

OTHER PUBLICATIONS

International Telecommunication Union, Series H: Audiovisual and Multimedia Systems Infrastructure of audiovisual services—Coding of moving video, ITU-T H.265, Nov. 2019.
Eric W. Tramel and James E. Fowler, Video compressed sensing with multihypothesis, 2011 Data Compression Conference, 2011, pp. 193-202.
Chen Chen et al., Compressed-sensing recovery of images and video using multihypothesis predictions, IEEE 2011, pp. 1193-1198.

\* cited by examiner

PREDICTION IMAGE ACQUISITION APPARATUS, ORIGINAL SIGNAL ACQUISITION APPARATUS, PREDICTION IMAGE ACQUISITION METHOD AND PROGRAM

CROSS-REFERENCE TO RELATED APPLICATIONS

This application is a 371 U.S. National Phase of International Application No. PCT/JP2019/043593 filed on Nov. 7, 2019, which claims priority to Japanese Application No. 2018-213790 filed on Nov. 14, 2018. The entire disclosures of the above applications are incorporated herein by reference.

TECHNICAL FIELD

The present invention relates to a predictive image acquisition device, an original signal acquisition device, a predictive image acquisition method, and a program.

BACKGROUND ART

Compressed sensing is a sampling technique for originally generating an unknown original signal that is an acquisition target from an observation signal having a smaller number of elements acquired instead of the original signal (see Non Patent Literature 1). The observation signal is an M-dimensional (here, M<<N) vector generated by multiplying an original signal x that is an N-dimensional vector by an "M×N"-dimensional observation matrix Φ. In compressed sensing, it is assumed that the original signal that is a target is sparse. Further, the original signal itself may not be sparse, but may be transformed to be sparse through a certain linear transformation. Hereinafter, a process of obtaining the original image from the observation matrix Φ and the observation signal in compressed sensing is referred to as "restoration". The observation matrix Φ is defined in advance and is always treated as known.

Restoring an N-dimensional original signal from an M-dimensional observation signal is an ill-posed problem. That is, in general, a solution cannot be uniquely determined. In compressed sensing, it is assumed that an original signal is sparsely transformed using a certain transformation matrix such that the N-dimensional original signal is restored from the M-dimensional observation signal.

In a typical example of a method of restoring an original signal, it is assumed that the original signal can be transformed to a sparse transformation factor through certain transformation. An L1 norm (sum of absolute values) of a transformation factor is added as a regularization term to a formula, such that the original signal is restored as in Formula (1).

[Formula 1]

$$x = \mathrm{argmin}_{\hat{x}} \|y - \Phi\hat{x}\|_2 + \lambda\|\Psi\hat{x}\|_1 \qquad (1)$$

Here, Ψ is a sparse transformation matrix such as a discrete cosine transform or a discrete wavelet transform. λ represents a weighting factor. It is generally known that, when an image signal is subjected to a discrete cosine transform, an absolute value of a transformation factor corresponding to a basis vector of a high frequency component becomes small, and Ψx can be assumed to be a sparse vector. In Formula (1), the compression efficiency is higher when M is smaller, but the restoration performance is lower when M is smaller. The restoration performance in compressed sensing is higher when (M/N) is closer to 1. The restoration performance in compressed sensing is higher when the transformation factor Ψx of the original signal is more sparse, that is, when the non-zero factor in the transformation factor Ψx is smaller. Therefore, when an original signal that is a restoration target has high sparsity, it is possible to restore the original image from the observation signal with high accuracy even when M is small. Further, for example, restoration using machine learning has been proposed, in addition to restoration using L1 regularization. For example, in restoration using a convolutional neural network, a transformation matrix Ψ is not clearly defined, and a convolutional neural network in which the observation signal is an input and the restored original signal is an output is constructed.

In moving image encoding using compressed sensing, a decoding device does not perform a restoration process in compressed sensing on an original image from an observation signal, and a prediction residual signal assumed to have higher sparsity than the original image itself is restored as in Formula (2) (see Non Patent Literature 2). This is based on the properties of compressed sensing that the restoration performance can be improved when a restoration target signal has a higher sparsity. Since the encoded data is generated from the observation signal, a code amount of the encoded data greatly depends on M. Therefore, improvement in restoration performance means improvement in encoding performance.

[Formula 2]

$$x_r = \mathrm{argmin}_{\hat{x}} \|y_r - \Phi\hat{x}\|_2 + \lambda\|\Psi\hat{x}\|_1 \qquad (2)$$

Here, $x_r$ represents a restored prediction residual signal. $y_r$ represents an observation signal of the prediction residual signal. The observation signal $y_r$ of the prediction residual signal is expressed as "$y_r = y - \Phi p$." This "p" represents a predictive signal.

A moving image encoding device using such compressed sensing may execute compression sampling for the original signal to generate an observation signal and encode the generated observation signal and does not have to generate a predictive signal (predictive image) for the original signal. The decoding device decodes the observation signal from transmitted encoded data. The decoding device generates the predictive signal from the decoded observation signal and a reference signal (a reference image). The decoding device generates an observation signal ($y_r = y - \Phi p$) of the prediction residual signal through matrix multiplication and subtraction from the decoded observation signal and the predictive signal generated by the decoding device. The decoding device applies the restoration process in the compressed sensing to generate a prediction residual signal from the observation signal of the prediction residual. The decoding device obtains a sum of the restored prediction residual signal and the predictive signal to restore the original image, and outputs the restored original image from the decoding device.

In a general moving image encoding scheme such as H.265/High Efficiency Video Coding (HEVC) (see Non Patent Literature 3), an encoding device generates a predictive image using a decoded image. Therefore, it is essential for the encoding device to have a decoding device for generating a decoded image as a component. Due to this restriction, a calculation load of the encoding device is always larger than a calculation load of the decoding device. On the other hand, in the moving image encoding device using compressed sensing, since a predictive image is not generated, the encoding device does not have to include a decoding device, and an encoding device with a smaller calculation load than the decoding device can be realized.

A prediction process is a very important technology in moving image encoding using compressed sensing.

Generation of a prediction residual signal with high accuracy in moving image encoding using compressed sensing leads to a reduction in code amount. The decoding device restores the original signal from the observation signal on the basis of the sparsity of the prediction residual signal. Therefore, since the sparsity of the prediction residual signal is improved when prediction accuracy of the image signal is higher, the decoding device can generate the prediction residual signal with high accuracy.

In a general moving image encoding scheme such as H.265/HEVC, an encoding device generates a predictive signal and transfers prediction information necessary for a decoding device to generate the same predictive signal as such a predictive signal to a decoding device. Therefore, the prediction accuracy and a code amount of the prediction information have a trade-off relationship. Therefore, in general moving image encoding, a prediction method that requires a very large number of variables is not suitable. For example, the number of motion vectors that are prediction information necessary to generate a predictive signal in motion compensation prediction is generally one or two. When an encoding device generates a predictive signal using two or more motion vectors, an encoding device of the related art generates a predictive signal from each motion vector and simply averages the two or more generated predictive signals or adds two or more predictive signals using a weighting factor determined for each frame or block.

In moving image encoding using compressed sensing, the decoding device executes the prediction process, but the encoding device does not execute the prediction process. Therefore, since the prediction information is not included in the encoded data, the encoding device does not increase a data amount of the encoded data due to the predictive signal, and the decoding device can generate the predictive signal on the basis of a large number of variables.

Many methods of generating a predictive signal in moving image encoding using compressed sensing have been proposed. In moving image encoding using compressed sensing in units of blocks, the encoding device generates an image (hereinafter referred to as a "combined predictive image") obtained by combining a plurality of predictive images, through linear coupling (Non Patent Literature 4). A weighting factor w is determined in a closed form by using a Tikhonov regularization method. A combined predictive image p is expressed by Formula (3).

[Formula 3]

$$p = Hw \quad (3)$$

Here, the combined predictive image p is expressed in a format of an "$N=B^2$"-dimensional column vector. B represents a block size. H represents a "$B^2 \times K$" dimensional matrix. K represents the number of predictive images included in the predictive image candidates. Each column vector of H represents a block column of a search range in a reference image. The weighting factor w shown in Formula (3) is expressed by a K-dimensional column vector. Each element of the weighting factor w is a scalar value corresponding to the predictive image candidate that is each column vector of H.

Formula (3) is expressed as Formula (4).

[Formula 4]

$$p = \sum_{j}^{K} c_j h_j \quad (4)$$

Here, $h_j$ is an element (predictive image candidate) of a set $R^N$, and represents a column vector of a j-th column of H. $c_j$ is an element of the set R, and represents an element of a j-th column of the weighting factor w shown in Formula (3). The combined predictive image p is generated by linearly coupling the predictive image candidates $h_1$. An optimum weighting factor w is expressed as in Formula (5).

[Formula 5]

$$\hat{w} = \operatorname*{argmin}_{w} \|y - \Phi H w\|_2 \quad (5)$$

Here, $\Phi$ represents a matrix of observation signals (an observation matrix). A problem to solve this is an ill-posed problem. Therefore, a Tikhonov regularization term $\Gamma$ is added to Formula (5), and a weighting factor $w_{t,i}$ is expressed in a closed form as in Formula (6).

[Formula 6]

$$\hat{w} = (\Phi H)^T (\Phi H) + \lambda^2 \Gamma^T \Gamma)^{-1} (\Phi H)^T y \quad (6)$$

In Non Patent Literature 5, elements other than a specific sub-block divided into four are 0. Predictive image candidates are generated in this way such that an optimal predictive image is generated in units of sub-blocks. A weighting factor in Non Patent Literature 5 is determined by Tikhonov regularization, as in NPL 4.

CITATION LIST

Non Patent Literature

[NPL 1] Emmanuel J Cand'es and Michael B Wakin. "An introduction to compressive sampling," IEEE signal processing magazine, Vol. 25, No. 2, pp. 21-30, 2008.
[NPL 2] Thong T Do, Yi Chen, Dzung T Nguyen, Nam Nguyen, Lu Gan, and Trac D Tran, "Distributed compressed video sensing", In Information Sciences and Systems, 2009. CISS 2009. 43rd Annual Conference on, pp. 1-2. IEEE, 2009.
[NPL 3] ISO ISO/IEC 23008-2:2017, "Information technology-High efficiency encoding and media delivery in heterogeneous environments-Part 2: High efficiency video encoding", October 2017.
[NPL 4] Eric W Tramel and James E Fowler, "Video compressed sensing with multihypothesis", In Data Compression Conference (DCC), 2011, pp. 193-202. IEEE, 2011.
[NPL 5] Chen Chen, Eric W Tramel, and James E Fowler, "Compressed-sensing recovery of images and video using multihypothesis predictions", In Signals, Systems and Computers (ASILOMAR), 2011 Conference Record of the Forty Fifth Asilomar Conference on, pp. 1193-1198. IEEE, 2011.

SUMMARY OF THE INVENTION

Technical Problem

In moving image encoding using compressed sensing, generation of a predictive image with high accuracy leads to encoding efficiency. In a general moving image encoding scheme such as H.265/HEVC, a prediction unit block called a prediction unit (PU) is set, and a variable block division shape of the PU is determined by rate distortion optimization. On the other hand, in moving image encoding using compressed sensing in units of blocks constituting a frame of an image, the rate distortion optimization is not executed, and the original image is divided into blocks having a fixed size. Therefore, in the motion compensation using one motion vector, a predictive image with high accuracy may not be generated, and the prediction residual signal may not be sparse. For example, when a foreground image and a background image move separately in a certain block forming the original image, the original image may not be accurately approximated in motion compensation using one motion vector, and a prediction residual signal may not be sparse. In such a case, when the decoding device applies a predictive image for a foreground image to a foreground area of the combined predictive image and applies a predictive image for a background image to a background area of the combined predictive image, it is possible to generate a combined predictive image with high accuracy similar to the original image. However, this method has a problem in Non Patent Literature 4, for example.

Figure 6:
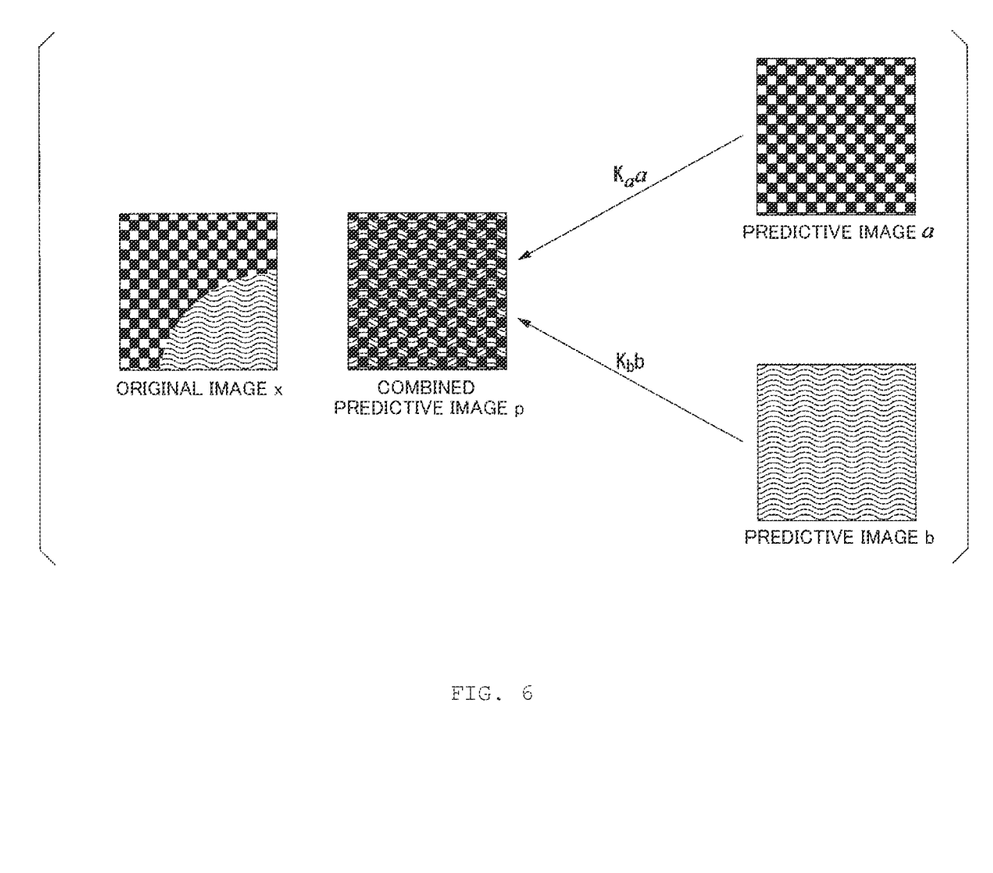
FIG. 6 is a diagram illustrating an example of two predictive images included in predictive image candidates and a combined predictive image.

FIG. 6 is a diagram illustrating an example of two predictive images included in predictive image candidates and a combined predictive image. In Non Patent Literature 4, a decoding device linearly couples predictive image candidates using a weighting factor having a scalar value to generate a combined predictive image. In FIG. 6, the combined predictive image p ($=k_a a + k_b b$) is generated using a method disclosed in Non Patent Literature 4 on the basis of a predictive image a, a predictive image b, and scalar values $k_a$ and $k_b$.

In FIG. 6, the predictive image a matches an area other than a lower right area of the original image x. The predictive image b matches the lower right area of the original image x. Thus, when the predictive image is accurate only in a local area of the original image x, the predictive image candidate has a weighting factor for an entire area of the original image in linear coupling having the weighting factor having a scalar value for each predictive image candidate, as in Non Patent Literature 4. Therefore, the combined predictive image p, which is an image obtained by combining the predictive image a with the predictive image b, does not approximate the original image. In Non Patent Literature 5, the predictive image candidates are generated in units of sub-blocks, but the predictive image candidates have weighting factors for the entire area of the sub-blocks.

A sub-block division method is quadtree division and is fixed division into four squares obtained by halving each side of the sub-block. Therefore, when the sub-block and a shape of a foreground area do not match, the combined predictive image p does not approximate the original image. Thus, the device of the related art may not be able to improve the compression efficiency of a signal such as a moving image.

In view of the above circumstances, an object of the present invention is to provide a predictive image acquisition device, an original signal acquisition device, a predictive image acquisition method, and a program capable of improving signal compression efficiency.

Means for Solving the Problem

One aspect of the present invention is a predictive image acquisition device for associating an observation signal, the observation signal being a signal obtained from an original image serving as a decoding target image and being a lower dimensional signal than the original image, a first predictive image having a high correlation with the original image, and a second predictive image having a high correlation with the original image with each other to obtain a combined predictive image, the predictive image acquisition device including: an interpolation factor acquisition unit configured to obtain an interpolation factor set for each pixel of the combined predictive image from the first predictive image, the second predictive image, and the observation signal; and a combined predictive image acquisition unit configured to combine the first predictive image and the second predictive image for each pixel using the interpolation factor to obtain the combined predictive image, wherein the pixels constituting the observation signal are expressed by a linear sum of the original image.

One aspect of the present invention is the predictive image acquisition device, wherein the first predictive image includes an area having a high correlation with a first area in the original image, and the second predictive image includes an area having a high correlation with a second area, the second area being a complementary area of the first area in the original image.

One aspect of the present invention is the predictive image acquisition device, wherein the interpolation factor is set to have high sparsity on the basis of a predetermined transformation basis.

One aspect of the present invention is the predictive image acquisition device, wherein the interpolation factor is a real number representing, for each pixel, which one of a pixel of the first predictive image and a pixel of the second predictive image is to be the pixel of the combined predictive image.

One aspect of the present invention is an original signal acquisition device including a predictive signal acquisition device for associating an observation signal, the observation signal being a signal obtained from an original signal serving as a decoding target signal and being a lower dimensional signal than the original signal, a first predictive signal having a high correlation with the original signal, and a second predictive signal having a high correlation with the original signal with each other to obtain a combined predictive signal, the original signal acquisition device including: an interpolation factor acquisition unit configured to obtain an interpolation factor set for each element of the combined predictive signal from the first predictive signal, the second predictive signal, and the observation signal; a combined predictive signal acquisition unit configured to combine the first predictive signal and the second predictive signal for each element using the interpolation factor to obtain the combined predictive signal; and a reconstruction unit configured to reconstruct the original signal using the combined predictive signal, wherein the elements constituting the observation signal are expressed by a linear sum of the original signal.

One aspect of the present invention is a predictive image acquisition method executed by a predictive image acquisition device for associating an observation signal, the observation signal being a signal obtained from an original image serving as a decoding target image and being a lower dimensional signal than the original image, a first predictive image having a high correlation with the original image, and a second predictive image having a high correlation with the original image with each other to obtain a combined predictive image, the predictive image acquisition method including: obtaining an interpolation factor set for each pixel of the combined predictive image from the first predictive image, the second predictive image, and the observation signal; and combining the first predictive image with the second predictive image for each pixel using the interpolation factor to obtain the combined predictive image, wherein the pixels constituting the observation signal are expressed by a linear sum of the original image.

One aspect of the present invention is a program for causing a computer of a predictive image acquisition device for associating an observation signal, the observation signal being a signal obtained from an original image serving as a decoding target image and being a lower dimensional signal than the original image, a first predictive image having a high correlation with the original image, and a second predictive image having a high correlation with the original image with each other to obtain a combined predictive image, to execute: a procedure of obtaining an interpolation factor set for each pixel of the combined predictive image from the first predictive image, the second predictive image, and the observation signal; and a procedure of combining the first predictive image with the second predictive image for each pixel using the interpolation factor to obtain the combined predictive image, wherein the pixels constituting the observation signal are expressed by a linear sum of the original image.

Effects of the Invention

According to the present invention, it is possible to improve signal compression efficiency.

DESCRIPTION OF EMBODIMENTS

Embodiments of the present invention will be described in detail with reference to the drawings.
(Overview)
In encoding using compressed sensing, an encoding device executes sampling of compressed sensing (hereinafter referred to as "compression sampling") for data that is an encoding target (an original signal) to generate an observation signal. The encoding device performs a quantization process on the observation signal. The encoding device executes entropy encoding for the quantized observation signal to generate encoded data of the observation signal. The original signal is not limited to an image signal. Hereinafter, the encoding device executes quantization and entropy encoding of the original image as an example of encoding using compressed sensing to generate the encoded data of the image. The image may be any of a two-dimensional moving image, a two-dimensional still image, a three-dimensional moving image, a three-dimensional still image, a fluoroscopic image for medical use, etc., and a graph.

A decoding device of the embodiment includes a predictive image acquisition device. Hereinafter, an interpolation factor is any real number representing, for each pixel, which one of pixel of a first predictive image and a pixel of a second predictive image is a pixel of a combined predictive image. The interpolation factor is set to have high sparsity on the basis of a predetermined transformation basis. The interpolation factor is set for each pixel. Therefore, hereinafter, the interpolation factor is referred to as an "interpolation factor vector." The predictive image acquisition device combines two or more predictive images (predictive image candidates) using linear coupling or the like on the basis of the interpolation factor vector of the predictive image (predictive signal). The interpolation factor vector indicates, for each pixel of the predictive image, which image of the two or more predictive images has a strong influence on the combined predictive image. In the embodiment, it is assumed that the interpolation factor vector is sparse.

The interpolation factor vector is expressed by a column vector having the same number of dimensions as the number of dimensions of a block of a decoding target image (an original image). A problem of calculation of an N-dimensional interpolation factor vector on the basis of two predictive images and an M-dimensional observation signal is generally an ill-posed problem. In the embodiment, since it is assumed that the interpolation factor vector is sparse, a predictive image acquisition device generates the interpolation factor vector using a method that is the same as in normal compressed sensing, that is, a method in which an L1 norm regularization term is added to a formula.

Hereinafter, symbols added above characters in formulas are written before the characters. For example, the symbol "^" added above a character in a formula is written before the character "x" below as "^x".

The predictive image acquisition device generates a combined predictive image "$\hat{x}$" as in Formula (7) on the basis of the predictive image a and the predictive image b that are predictive image candidates and an interpolation factor vector w.

[Formula 7]

$$\hat{x} = w \circ a + \left( \begin{bmatrix} 1 \\ \vdots \\ 1 \end{bmatrix} - w \right) \circ b \tag{7}$$

Here, each of "$\hat{x}$", "a", "b", and "w" is expressed by an $N(=B^2)$ dimensional column vector. The symbol "∘" represents a Hadamard product. An area included in the predictive image b is similar to a first area (local space) included in the original image. An area included in the predictive image a is similar to a second area included in the original image. The second area is a complementary area of the first area in the original image. The interpolation factor vector w has sparsity.

The predictive image acquisition device determines the interpolation factor vector on the basis of the observation signal (the encoded data). The predictive image acquisition device stores a feature of an area of the predictive image similar to an area of the original image as the interpolation factor vector.

The predictive image acquisition device selects two predictive images to be combined from among the predictive image candidates. In the embodiment, it is preferable for an area of the first predictive image to be similar to the first area in the original image and an area of the second predictive image to be similar to the second area in the original image, rather than the entire area of the predictive image being similar to the entire area of the original image. The predictive image acquisition device selects two predictive images including an area similar to each complementary area in the original image from the predictive image candidates. The predictive image acquisition device combines an area included in the selected first predictive image and an area included in the selected second predictive image on the basis of the interpolation factor vector for each pixel.

First Embodiment

Figure 1:
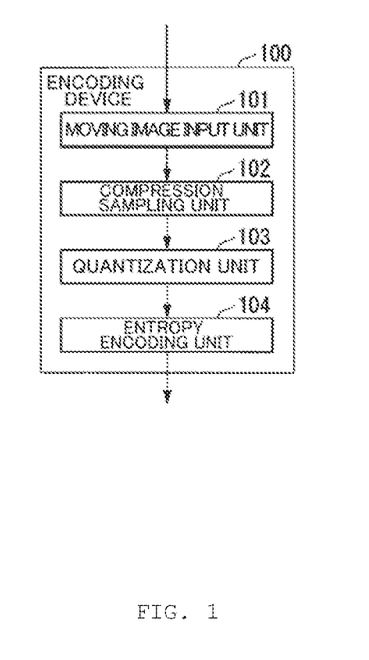
FIG. 1 is a diagram illustrating an example of a configuration of an encoding device in an embodiment.

FIG. 1 is a diagram illustrating an example of a configuration of the encoding device 100. The encoding device 100 is a device that executes an encoding process using compressed sensing. The encoding device 100 includes a moving image input unit 101, a compression sampling unit 102, a quantization unit 103, and an entropy encoding unit 104.

The encoding device 100 may further include a storage unit. The storage unit is preferably a non-volatile recording medium (a non-transitory recording medium) such as a flash memory or a hard disk drive (HDD). The storage unit may include a volatile recording medium such as a random access memory (RAM). The storage unit stores, for example, an encoding program.

A part or all of the encoding device 100 is realized by a processor such as a central processing unit (CPU) executing a program stored in the storage unit. Some or all functional units of the encoding device 100 may be realized by using hardware such as a large scale integration (LSI) and an application specific integrated circuit (ASIC).

The moving image input unit 101 acquires a moving image that is an encoding target from the outside of the encoding device 100. The compression sampling unit 102 executes compression sampling for blocks (encoding target blocks) constituting a frame that is an encoding target using a predetermined observation matrix Φ to generate an observation signal. The observation matrix Φ may be a matrix of any element, such as a random matrix. The quantization unit 103 quantizes the generated observation signal to generate quantized data.

The entropy encoding unit 104 executes entropy encoding on the quantized data to generate encoded data of the observation signal. Quantization and entropy encoding schemes are not limited to specific schemes. The entropy encoding unit 104 does not have to encode all frames of the encoding target using compressed sensing. The entropy encoding unit 104 may encode some of the frames of the encoding target using compressed sensing, and encode the remaining frames of the encoding target using an image encoding method such as HEVC or Joint Photographic Experts Group (JPEG). Thereby, the entropy encoding unit 104 can reduce the number of frames that are encoded using an image encoding method such as HEVC or JPEG in which an amount of calculation is large, and thus reduce the amount of encoding calculation.

Figure 2:
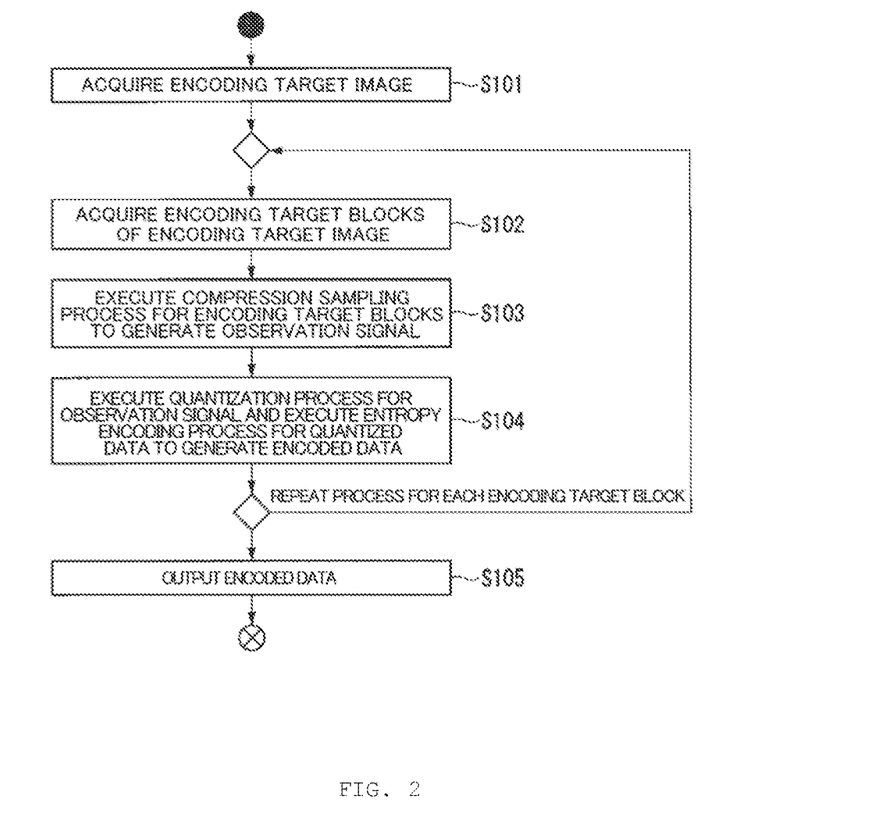
FIG. 2 is a flowchart illustrating an example of an operation of the encoding device in the embodiment.

FIG. 2 is a flowchart illustrating an example of an operation of the encoding device 100. The moving image input unit 101 acquires the moving image that is an encoding target from the outside of the encoding device 100. The moving image input unit 101 sequentially outputs frames of the moving image that is an encoding target as an encoding target image to the compression sampling unit 102 (step S101).

The encoding device 100 executes each process from steps S102 to S104 for each of the encoding target blocks of the encoding target image.

The compression sampling unit 102 acquires the encoding target blocks of the encoding target image (step S102). The compression sampling unit 102 executes compression sampling for the encoding target blocks using the predetermined observation matrix Φ to generate the observation signal. That is, the compression sampling unit 102 multiplies the encoding target blocks of the encoding target image represented by an N-dimensional column vector x by an M×N-dimensional (here, M<<N) observation matrix Φ to generate the observation signal y (=Φx) expressed by the M-dimensional column vector (step S103).

The compression sampling unit 102 may generate the observation signal y (=Φx) using means other than computation processing. For example, when coded aperture masks are disposed between a lens and an image sensor, the compression sampling unit 102 may control light transmittance on a pixel-by-pixel basis using the coded aperture masks to generate the observation signal y at the time of capturing the original image.

The quantization unit 103 quantizes the generated observation signal to generate quantized data. The entropy encoding unit 104 executes entropy encoding for the quantized data to generate encoded data of the encoding target image (step S104).

When each of the processes from steps S102 to S104 is executed for all the encoding target blocks of the encoding target image, the entropy encoding unit 104 outputs the encoded data of the encoding target image to the decoding device (step S105).

Next, a decoding device (an original signal acquisition device or original image acquisition device) will be described.

Figure 3:
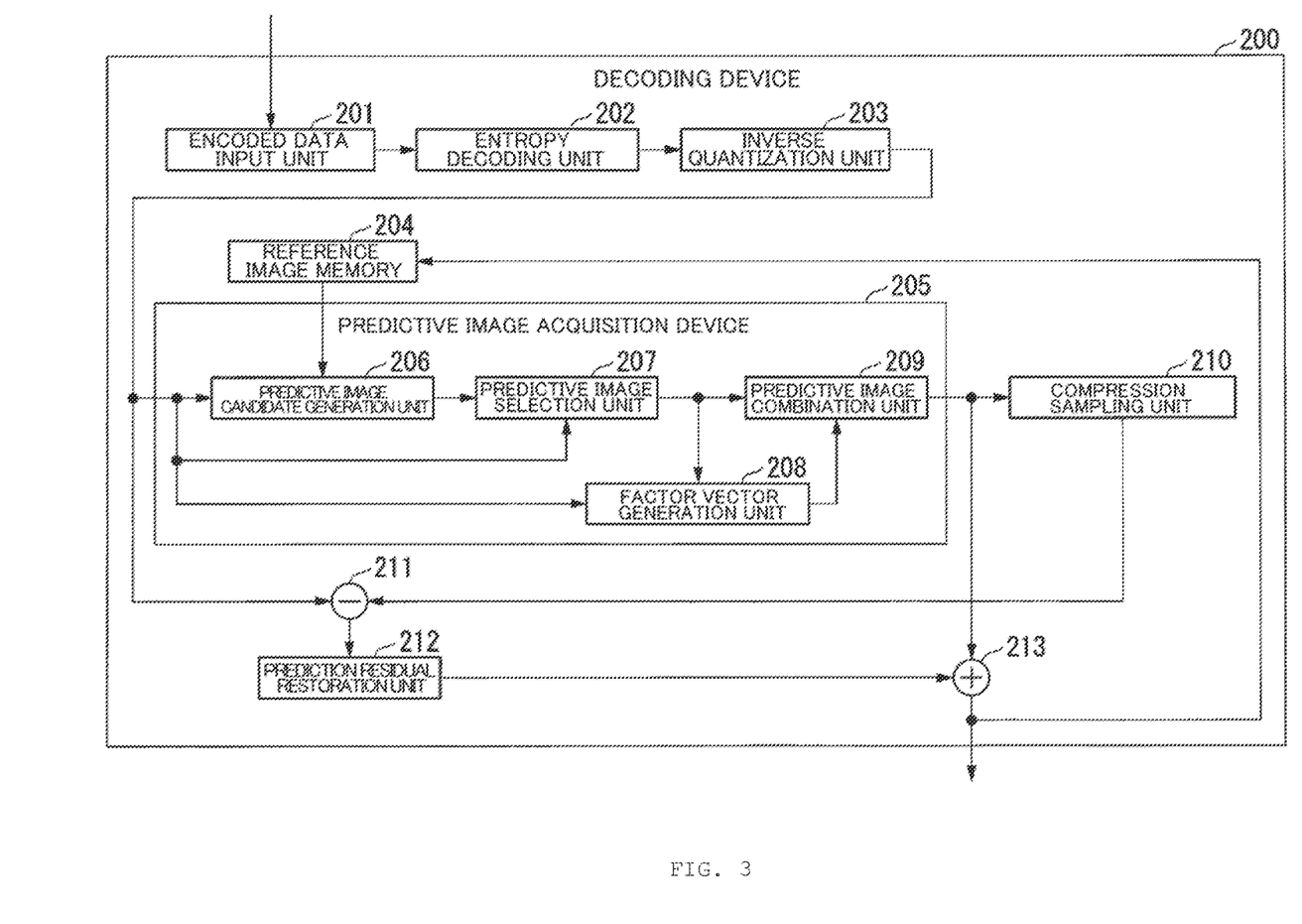
FIG. 3 is a diagram illustrating an example of a configuration of a decoding device in the embodiment.

FIG. 3 is a diagram illustrating an example of a configuration of a decoding device 200. The decoding device 200 is a device that executes a decoding process using compressed sensing. The decoding device 200 includes an encoded data input unit 201, an entropy decoding unit 202, an inverse quantization unit 203, a reference image memory 204, and a predictive image acquisition device 205. The predictive image acquisition device 205 includes a predictive image candidate generation unit 206, a predictive image selection unit 207, a factor vector generation unit 208, and a predictive image combination unit 209. The decoding device 200 further includes a compression sampling unit 210, a subtraction unit 211, a prediction residual restoration unit 212, and an addition unit 213.

The decoding device 200 may further include a storage unit. The storage unit is preferably a non-volatile recording medium (non-transitory recording medium) such as a flash memory or an HDD. The storage unit may include a volatile recording medium such as a RAM. The storage unit stores, for example, a decoding program.

A part or all of the decoding device 200 is realized by a processor such as a CPU executing a program stored in the storage unit. Some or all of functional units of the decoding device 200 may be realized using hardware such as an LSI or an ASIC.

The encoded data input unit 201 acquires the encoded data from the encoding device 100. The entropy decoding unit 202 (a reconstruction unit) executes an entropy decoding process (a reconstruction process) for the encoded data of a decoding target block. The inverse quantization unit 203 executes an inverse quantization process for the encoded data subjected to entropy decoding to decode the observation signal y.

The decoding device 200 decodes an observation signal for a decoding target frame included in each piece of encoded data sequentially input to the encoded data input unit 201. The reference image memory 204 stores, for example, images decoded up to the previous time as the reference image. The predictive image acquisition device 205 generates a combined predictive image that is a predictive image (a predictive signal) of the original image on the basis of the decoded observation signal and the image stored in the reference image memory 204.

The predictive image candidate generation unit 206 generates a plurality of predictive images as predictive image candidates on the basis of the reference image stored in the reference image memory 204. The predictive image selection unit 207 selects two predictive images (a predictive image pair) from the predictive image candidates on the basis of the decoded observation signal.

The first area included in the selected first predictive image has a high correlation with the first area included in the original image (the decoding target image). The second area included in the selected second predictive image has a high correlation with the second area that is an area other than the first area included in the original image. This correlation is a difference (closeness) between a pixel value of a pixel of the original image and a pixel value of a pixel of the predictive image, that is, a degree of similarity between the image of the area included in the original image and the image of the area included in the predictive image. The correlation being high (low) means which of a correlation between the original image and the first predictive image and a correlation between the original image and the second predictive image is relatively high (low).

The factor vector generation unit 208 generates the interpolation factor vector w using an optimization problem on the basis of the two predictive images and the observation signal y. The predictive image combination unit 209 (a predictive signal combination unit, a combined predictive signal acquisition unit, or a predictive signal acquisition device) generates a combined predictive image 302 "p" on the basis of two predictive images.

The compression sampling unit 210 acquires the combined predictive image p from the predictive image combination unit 209. The compression sampling unit 210 generates an observation signal $\Phi p$ of a predictive image (predictive signal) on the basis of the combined predictive image p and the observation matrix $\Phi$. The subtraction unit 211 subtracts the observation signal $\Phi p$ of the predictive signal from the observation signal y decoded by the inverse quantization unit 203. The subtraction unit 211 outputs an observation signal "y−$\Phi p$" of the prediction residual signal that is a subtraction result to the prediction residual restoration unit 212. The prediction residual restoration unit 212 restores the prediction residual signal on the basis of the observation signal "y−$\Phi p$" of the prediction residual signal. The addition unit 213 adds the restored prediction residual signal and the predictive image to decode the image of the decoding target block. When the images of all the decoding target blocks in the frame of the decoding target image are decoded, the addition unit 213 outputs the frame of the decoded decoding target image (moving image) to the reference image memory 204 and a predetermined external device.

Figure 4:
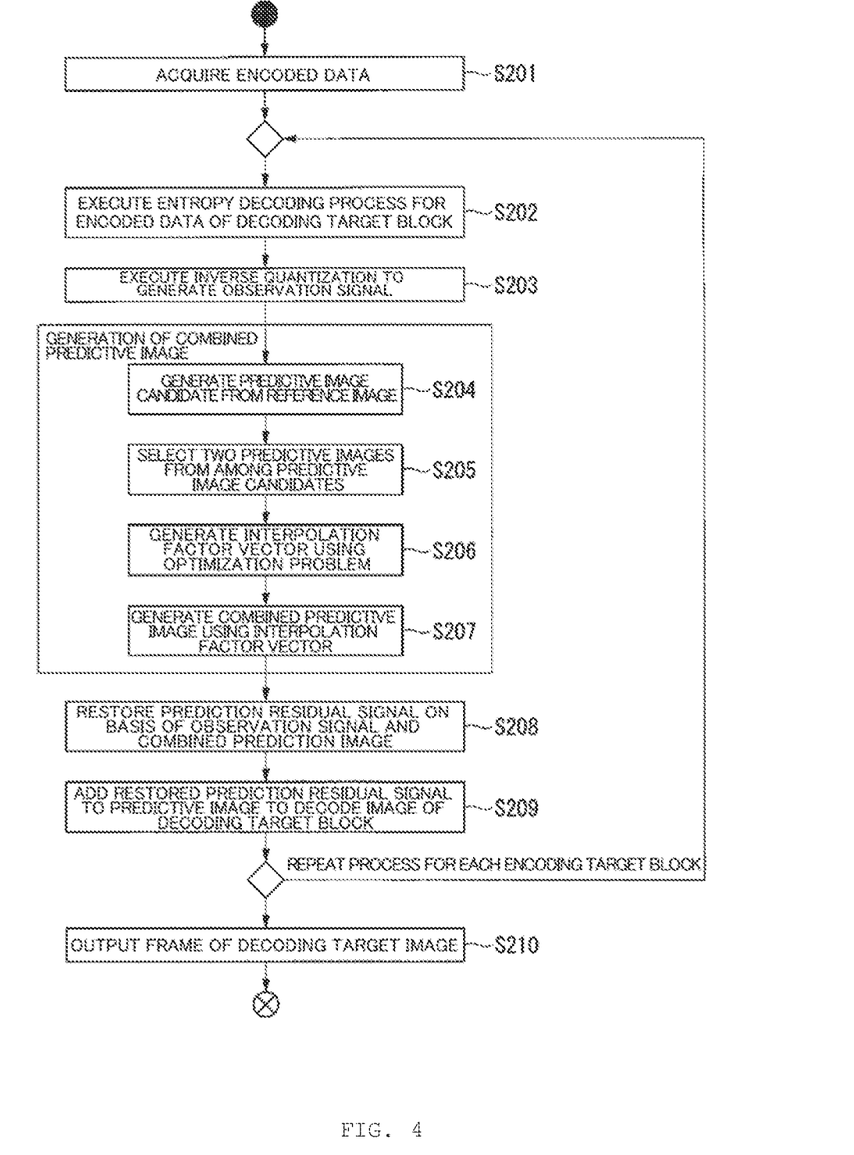
FIG. 4 is a flowchart illustrating an example of an operation of the decoding device in the embodiment.

FIG. 4 is a flowchart illustrating an example of an operation of the decoding device 200. The encoded data input unit 201 acquires the encoded data from the encoding device 100. The encoded data input unit 201 outputs the encoded data to the entropy decoding unit 202. The observation matrix $\Phi$ is defined in advance, and the encoding device 100 and the decoding device 200 hold the same observation matrix $\Phi$. Further, the encoded data input unit 201 may acquire the observation matrix $\Phi$ encoded by the encoding device 100. The decoding device 200 acquires the same observation matrix $\Phi$ as the observation matrix $\Phi$ used by the encoding device 100 (step S201).

The decoding device 200 executes respective processes from steps S202 to S209 for each decoding target block of the decoding target image (the original image).

The entropy decoding unit 202 executes the entropy decoding process for the encoded data of the decoding target block (step S202). The inverse quantization unit 203 executes an inverse quantization process for the encoded data subjected to entropy decoding to generate the observation signal (step S203).

The reference image memory 204 stores the image decoded by the predictive image acquisition device 205, the prediction residual restoration unit 212, and the addition unit 213 as a reference image. The reference image is an image that the predictive image acquisition device 205 can refer to when predicting a combined predictive image of the decoding target image. The reference image is not limited to a specific image as long as the image is an image having high correlation with the decoding target image (an image having a similar pixel value). The reference image may be an image of which a frame different from the frame of the decoding target image has been decoded, or may be an image of a decoded block in the same frame as the frame of the decoding target image. The reference image may be an image encoded and decoded using an image encoding method such as HEVC or JPEG. The reference image may include a foreground image (an image of a subject or the like) and a background image that is included in the decoding target image generated using some method.

The predictive image acquisition device 205 generates the predictive image (the predictive signal) on the basis of the observation signal and the reference image in steps S202 to S209.

Figure 5:
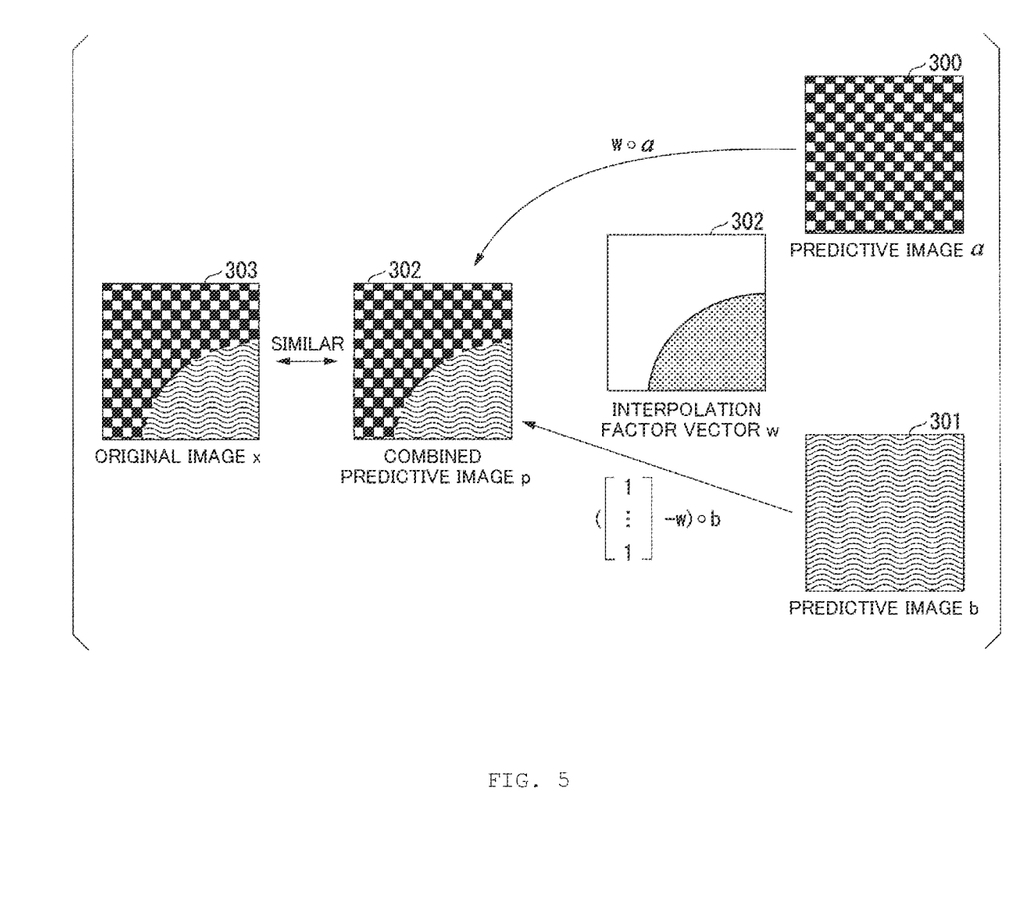
FIG. 5 is a diagram illustrating an example of two predictive images included in predictive image candidates and a combined predictive image in the embodiment.

FIG. 5 is a diagram illustrating an example of two predictive images included in the predictive image candidates and a combined predictive image. The predictive image acquisition device 205 executes linear interpolation using the interpolation factor vector w for a predictive image 300 "a" and a predictive image 301 "b" selected by the predictive image selection unit 207 to generate the combined predictive image p as in Formula (8).

[Formula 8]

$$p = w \circ a + \left(\begin{bmatrix} 1 \\ \vdots \\ 1 \end{bmatrix} - w\right) \circ b \qquad (8)$$

Here, each of "p", "a", "b", and "w" is expressed by an N(=$B^2$)-dimensional column vector. A symbol "∘" represents a Hadamard product. An area included in the predictive image 300 "a" is similar to the first area (local space) included in the original image 303 "x". An area included in the predictive image 301 "b" is similar to the second area included in the original image 303 "x". The second area is a complementary area of the first area in the original image. The interpolation factor vector w has sparsity.

The predictive image acquisition device 205 selects two predictive images from the predictive image candidates. The predictive image acquisition device 205 executes the linear interpolation using the interpolation factor vector w for the selected two predictive images. The predictive image acquisition device 205 combines an area similar to the first area of the original image 303 "x" in the predictive image 300 "a" with an area similar to the second area of the original image 303 "x" in the predictive image 301 "b" to generate the combined predictive image 302 "p" similar to the original image 303 "x".

Referring back to FIG. 4, the description of the example of the operation of the decoding device 200 will be continued. The predictive image candidate generation unit 206 generates K predictive images as predictive image candidates on the basis of the reference images stored in the reference image memory 204. A method in which the predictive image candidate generation unit 206 generates a predictive image candidates $h_k$ is not limited to a specific method.

For example, when the predictive image candidate generation unit 206 generates the predictive image candidate $h_k$ through inter prediction in which the reference image is referred to, the predictive image candidate generation unit 206 shifts a reference area for each predetermined number of pixels in a search range of the reference image to generate the predictive image candidate $h_k$. When the predictive image candidate generation unit 206 generates a predictive image through intra prediction on the basis of an image of the decoded block in the same frame as the frame of the decoding target image, the predictive image candidate generation unit 206 may include each predictive image generated in all possible prediction modes in the predictive image candidates. In the predictive image candidate, both the predictive image generated through the inter prediction and the predictive image generated through the inter prediction may be present. The predictive image candidate generation unit 206 may generate the predictive image included in the predictive image candidate using affine transformation, brightness correction, or the like that is also attempted in general moving image encoding (step S204).

The predictive image selection unit 207 acquires the predictive image candidates from the predictive image candidate generation unit 206. The predictive image selection unit 207 acquires the decoded observation signal from the inverse quantization unit 203. The predictive image selection unit 207 selects the two predictive images (the predictive image pair) from among the predictive image candidates on the basis of the decoded observation signal. A method in which the predictive image selection unit 207 selects the two predictive images from among the predictive image candidates $\{h_k \mid k \in K\}$ is not limited to a specific method.

When the predictive image selection unit 207 selects one predictive image from the predictive image candidates, it is difficult for the decoding device 200 to select an optimal predictive image from among the predictive image candidates $h_k$ because the original image x is unknown. Therefore, there are two methods (a first selection method and a second selection method) for selecting the optimal predictive image from the predictive image candidates $h_k$.

In the first selection method, the predictive image selection unit 207 decodes the original image x from the observation signal y and selects a predictive image that minimizes a sum of squared errors of prediction (SSE) between the decoded original image x and the predictive image from among the predictive image candidates.

[Formula 9]

$$p = \operatorname*{argmin}_{h_k \in \{h_k \mid k \in K\}} \left\| \breve{x} - h_k \right\|_2^2 \qquad (9)$$

Here, "$^U x$" represents the decoded original image.

The estimation accuracy of the predictive image using a first selection method (SSE of an x-domain) greatly depends on decoding performance of "$^U x$". The predictive image selection unit 207 uses the decoded original image "$^U x$" for selection of the predictive image. The predictive image selection unit 207 decodes the prediction residual signal to generate a finally decoded original image (a decoding target image).

In the second selection method (SSE in a y domain), the predictive image selection unit 207 selects the predictive image as shown in Formula (10) from among the predictive image candidates on the basis of a sum of squared errors of prediction of the decoded observation signal and the observation signal of the predictive image.

[Formula 10]

$$p = \operatorname*{argmin}_{h_k \in \{h_k \mid k \in K\}} \| y - \Phi h_k \|_2^2 \qquad (10)$$

When the predictive image selection unit 207 selects the two predictive images from among the predictive image candidates, it is preferable for an area of the predictive image 300 "a" is similar to the first area in the original image 303 "x", and an area of the predictive image 301 "b" is similar to the second area that is a complementary area of the first area in the original image 303 "x", rather than a case in which the selected predictive image 300 "a" and predictive image 301 "b" are similar to the entire area of the original image 303 "x". Therefore, the predictive image selection unit 207 may not simply set the first predictive image candidate $h_k$ as the predictive image 300 "a" and the second predictive image candidate $h_k$ as the predictive image 301 "b" in an ascending order of "SSE in the x domain" or "SSE in the y domain". The predictive image selection unit 207 evaluates costs of the predictive image 300 "a" and the predictive image 301 "b" on the basis of the objective function shown in Formula (11). Formula (11) shows a smaller value (smaller cost) as the predictive image 300 "a" is similar to the original image 303 "x" in an area in the original image 303 "x", and the predictive image 301 "b" is similar to the original image 303 "x" in a complementary area in the original image 303 "x".

[Formula 11]

$$\text{cost}(a,b) = (\tilde{x}[i] - a[i])^2 (\tilde{x}[i] - b[i])^2 \quad (11)$$

Here, "$^U x_i$" represents an i-th element (pixel) of the decoded observation signal (original image) "$^U x$". The predictive image "$a_i$" represents an i-th element (pixel) of the predictive image "a". The predictive image "$b_i$" represents an i-th element (pixel) of the predictive image "b".

The predictive image selection unit 207 may evaluate the costs of the predictive image 300 "a" and the predictive image 301 "b" in the x domain on the basis of the objective function shown in Formula (11) or may evaluate the costs of the predictive image 300 "a" and the predictive image 301 "b" in the y domain on the basis of the same objective function.

The predictive image selection unit 207 selects the predictive image 300 "a" and the predictive image 301 "b" from the predictive image candidates on the basis of Formula (12) using the reference image, the predictive image candidate, and the decoded observation signal.

[Formula 12]

$$a, b = \underset{h_{k_0}, h_{k_0} \in \{h_k | k \in K\}}{\text{argmin}} \text{cost}(h_{k_0}, h_{k_1}) \quad (12)$$

Time complexity of Formula (12) is expressed as Formula (13).

[Formula 13]

$$\mathcal{O}(K^2) \quad (13)$$

For the time complexity of Formula (12), when the predictive image selection unit 207 executes inter prediction, only a time complexity of minimum values in a search space of the predictive image candidates "$h_k \in \{h_k | k \in K\}$" may be a target. When a number of the minimum values is K' (here, K'≤K), the time complexity of Formula (13) is expressed by Formula (14) (step S205).

[Formula 14]

$$\mathcal{O}(K'^2) \quad (14)$$

The factor vector generation unit 208 generates the interpolation factor vector w using an optimization problem on the basis of the predictive image 300 "a" and the predictive image 301 "b" and the observation signal y (step S206).

The sparsity of the interpolation factor vector w will be described. In FIG. 5, the predictive image combination unit 209 generates the combined predictive image 302 "p" on the basis of the predictive image 300 "a" and the predictive image 301 "b". The predictive image 300 "a" matches the original image 303 "x" in the first area in the original image 303 "x". The predictive image 301 "b" matches the original image 303 "x" in the second area that is the complementary area of the first area in the original image 303 "x". When "$w_i \in \{0, 1\}$" is satisfied, the interpolation factor vector w serves as a mask for the predictive image 300 "a" and the predictive image 301 "b". That is, the interpolation factor vector w represents which of pixel of the predictive image 300 "a" and the pixel of the predictive image 301 "b" is selected, for each pixel of the combined predictive image 302 "p".

The interpolation factor vector w means the area of the original image 303 "x" that can be expressed with high accuracy in one predictive image included in the predictive image candidates. It can be assumed that the interpolation factor vector w has high sparsity. This is because, for example, when each of the predictive image 300 "a" and the predictive image 301 "b" is an inter predictive image using motion compensation, the interpolation factor vector w is a segmentation image that represents a shape of a moving body image in the original image 303 "x", and thus, it can be expected that the interpolation factor vector w has a high sparsity.

Referring back to FIG. 4, description of the example of the operation of the decoding device 200 will be continued. When an element $w_i$ of the interpolation factor vector w is defined as "$w_i \in [0, 1]$", an element $p_i$ of the combined predictive image p defined in Formula (8) is "$p_i = w_i a_i + (1 - w_i) b_i$". Therefore, the combined predictive image p is expressed by the interpolation of a predictive image $a_i$ and a predictive image $b_i$. The combined predictive image p is expressed by a pixel value between a pixel value of the predictive image $a_i$ and a pixel value of the predictive image $b_i$.

When the element $w_i$ of the interpolation factor vector w is defined as any real number, the combined predictive image p is expressed by extrapolation of the predictive image $a_i$ and the predictive image $b_i$ having different pixel values. When a sum of a factor $w_{1i}$ and a factor $w_{2i}$ is arbitrary, the combined predictive image p is expressed by a linear coupling such as "$p_i = w_{1i} a_i + w_{2i} b_i$". An expression range of the pixel value of the combined predictive image p may be limited according to interpolation, extrapolation, or linear coupling.

Since the sparsity of the interpolation factor vector w is assumed, the interpolation factor vector w is generated using the same method as a restoration method in compressed sensing. A method of generating the interpolation factor vector w may be any method such as a restoration method using L1 regularization or machine learning as long as the method is the same as an effective method that is used in restoration of compressed sensing.

Formula (15) represents an example of a definition of an objective function of the optimization problem for generating the interpolation factor vector w through L1 regularization.

[Formula 15]

$$\begin{aligned} w &= \underset{\hat{w}}{\text{argmin}} \|y - \Phi p\|_2 + \lambda \|\Psi \hat{w}\|_1 \\ &= \underset{\hat{w}}{\text{argmin}} \left\| y - \left( \Phi \hat{w} \circ a + \Phi \left( \begin{bmatrix} 1 \\ \vdots \\ 1 \end{bmatrix} - \hat{w} \right) \circ b \right) \right\|_2 + \lambda \|\Psi \hat{w}\|_1 \\ &= \underset{\hat{w}}{\text{argmin}} \|\Phi' \hat{w} - y'\|_2 + \lambda \|\Psi \hat{w}\|_1 \end{aligned} \quad (15)$$

Here, Formulas (16) and (17) are satisfied.

[Formula 16]

$$\Phi' = \Phi \circ \begin{bmatrix} (a-b)^T \\ \vdots \\ (a-b)^T \end{bmatrix} \quad (16)$$

[Formula 17]

$$y' = \Phi b - y \quad (17)$$

Since a format of Formula (15) and a format of Formula (1) are the same, the optimization problem for generating the interpolation factor vector w is a convex optimum problem. An L1 regularization solution that is used in compressed sensing is applicable to the generation of the interpolation factor vector w.

The objective function of the optimization problem for generating the interpolation factor vector w through L1 regularization may be Formula (18) to which a total variation (TV) norm term is added. Using Formula (18), the predictive image combination unit 209 can curb high frequency noise and generate the combined predictive image p with improved subjective image quality.

[Formula 18]

$$w = \operatorname*{argmin}_{\hat{w}} \|\Phi'\hat{w} - y'\|_2 + \lambda_1 \|\Psi\hat{w}\|_1 + \lambda_2 \|\hat{w}\|_{TV} \quad (18)$$

Here, $\lambda_1$ and $\lambda_2$ represent any predetermined weighting factors.

The factor vector generation unit 208 solves the optimization problem through L1 regularization or the like by using the sparsity of the interpolation factor vector w expressed by Formula (15) and Formula (18), thereby generating the interpolation factor vector w. The method of generating the interpolation factor vector w is not limited to a specific method as long as the method is a method that can be used for restoration of a signal subjected to compressed sensing using the sparsity of the interpolation factor vector w. For example, the method of generating the interpolation factor vector w may be other than a restoration method resulting in the optimization problem expressed by Formulas (15) and (18), or may be a restoration method using machine learning such as a mixed Gaussian model or a convolutional neural network. When a generation method results in the optimization problem expressed by Formulas (15) and (18), an algorithm for solving the optimization problem is not limited to a specific algorithm (step S206).

The predictive image combination unit 209 acquires the predictive image 300 "a", the predictive image 301 "b", and the interpolation factor vector w. The predictive image combination unit 209 combines the predictive image 300 "a" with the predictive image 301 "b" on the basis of Formula (8) to generate the combined predictive image p. The output of the predictive image combination unit 209 is the output of the predictive image acquisition device 205 (step S207).

The predictive image combination unit 209 may combine three or more predictive images to generate the combined predictive image p. When the predictive image combination unit 209 combines the three or more predictive images, the predictive image combination unit 209 repeatedly executes a process of combining two predictive images. For example, when the predictive image combination unit 209 combines the three predictive images, the predictive image combination unit 209 first combines two predictive images.

The predictive image combination unit 209 combines the combined predictive image generated from the two predictive images with a third predictive image. Similarly, when the predictive image combination unit 209 combines four or more predictive images, the predictive image combination unit 209 repeatedly executes the process of combining two predictive images.

The predictive image combination unit 209 combines the three predictive images including the predictive image a, the predictive image b, and the predictive image c using two interpolation factor vectors including an interpolation factor vector wo and an interpolation factor vector $w_i$ to generate the combined predictive image p as in Formulas (19) and (20). In this case, when wo and $w_i$ are obtained through the L1 regularization, transformation can be performed on a tensor in which wo and $w_i$ have been coupled. In this case, it is possible to perform a more three-dimensional transformation considering a correlation between wo and $w_i$ that is impossible when a combination of two predictive images is repeated in order to realize a combination of three predictive images. It is expected that a higher quality interpolation factor vector can be obtained by transforming a restoration target signal to sparse through a more efficient transformation on the basis of the properties of restoration in compressed sensing.

[Formula 19]

$$p = w_0 \circ a + w_1 \circ b + \left(\begin{bmatrix}1\\ \vdots \\ 1\end{bmatrix} - (\hat{w}_0 + \hat{w}_1)\right) \circ c \quad (19)$$

[Formula 20]

$$w_0, w_1 = \operatorname*{argmin}_{\hat{w}_0, \hat{w}_1} \|y - \Phi p\|_2 + \lambda(\|\Psi\hat{w}_0\|_1 + \|\Psi\hat{w}_1\|_1) \quad (20)$$

The compression sampling unit 210 generates the observation signal Φp of the combined predictive image (predictive signal) on the basis of the combined predictive image p output from the predictive image combination unit 209 of the predictive image acquisition device 205 and the observation matrix Φ. The subtraction unit 211 subtracts the observation signal Φp of the predictive signal from the observation signal y decoded by the inverse quantization unit 203. The subtraction unit 211 outputs an observation signal "y−Φp (=Φ(x−p)" of the residual signal (x−p), which is a subtraction result, to the prediction residual restoration unit 212.

The prediction residual restoration unit 212 restores the prediction residual signal from the observation signal "y−Φp" of the prediction residual signal.

A method of restoring the prediction residual may be any method such as restoration using L1 regularization or machine learning as long as the method is the same as a method used in restoration of compressed sensing. Each of processes executed by the factor vector generation unit 208 and the prediction residual restoration unit 212 is the same process of restoring an N-dimensional original signal of which sparsity is assumed from an M-dimensional observation signal. Therefore, when a regularization method of each process executed by the factor vector generation unit 208 and the prediction residual restoration unit 212 is common, the factor vector generation unit 208 and the prediction residual restoration unit 212 may be integrated as a common functional unit (step S208).

The addition unit 213 adds the restored prediction residual signal and the predictive image to decode the image of the decoding target block (step S209). When the images of all the decoding target blocks in the frames of the moving image are decoded, the addition unit 213 outputs the decoded frame of the moving image to the reference image memory 204 and a predetermined external device (step S210).

As described above, the predictive image acquisition device 205 associates the observation signal that is a signal obtained from the original image serving as the decoding target image and is a lower dimensional signal than the original image, the predictive image a having a high correlation with the original image, and the predictive image b having a high correlation with the original image with each other to obtain the combined predictive image. The predictive image acquisition device 205 includes the predictive image candidate generation unit 206 (interpolation factor acquisition unit) and the predictive image combination unit 209 (a combined predictive image acquisition unit or a combined predictive signal acquisition unit). The predictive image candidate generation unit 206 obtains an interpolation factor set for each pixel of the combined predictive image from the predictive image a, the predictive image b, and the observation signal. The predictive image combination unit 209 combines the predictive image a with the predictive image b using an interpolation factor for each pixel to obtain the combined predictive image p. Pixels constituting the observation signal are expressed by a linear sum of the original image.

Thus, the predictive image combination unit 209 combines the first area of the predictive image a and the second area that is the area other than the first area of the predictive image b on the basis of the interpolation factor vector to generate the combined predictive image.

This makes it possible for the predictive image acquisition device 205 of the embodiment to improve the signal compression efficiency.

Since the interpolation factor vectors for respective pixels of the predictive image have all or approximately the same value when the two predictive images have a high degree of similarity (the two predictive images are similar to each other), the predictive image acquisition device 205 achieves the same effects as in a case in which two predictive images are combined using one weighting factor having a scalar value in the entire area of the predictive image. That is, the predictive image acquisition device 205 has special effects similar to bi-prediction or bidirectional prediction in HEVC. On the other hand, when the two predictive images do not have high similarity (the two predictive images are not similar to each other), an area similar to the original image is adaptively selected from the area of the predictive image of any one of the two predictive images, such that a combined predictive image with high accuracy can be generated. Whether the two predictive images have a high similarity or a low similarity may not be explicitly distinguished.

The predictive image acquisition device 205 of the embodiment improves the prediction accuracy of an image in moving image encoding using compressed sensing and thus, it is possible to improve encoding efficiency.

When the sparsity of the interpolation factor vector corresponding to each pixel of the predictive image is assumed, the predictive image acquisition device 205 can generate a combined predictive image similar to the original image on the basis of the predictive image and the interpolation factor vector. The predictive image acquisition device 205 can obtain a higher restoration performance by estimating the interpolation factor vector having a higher sparsity than the image signal and the prediction residual signal, as compared with a case in which the interpolation factor vector is not estimated. In the predictive image acquisition device 205, since a method of generating the interpolation factor vector results in an optimization problem in the same format as a format of a method of restoring the prediction residual signal, it is possible to share a search program for the optimization problem and functional units.

Since the encoding device 100 executes a sampling process without executing prediction, optimization, or the like to encode the observation signal of the original image, it is possible to reduce the amount of calculation in prediction and optimization processes. A calculation amount of the process executed by the decoding device 200 is larger than a calculation amount of the process executed by the encoding device 100 in the moving image encoding using compressed sensing. Thus, the encoding device 100 can effectively reduce a total calculation amount in encoding and decoding when moving image encoding with low power consumption is obtained or when only a part of a large encoded moving image is decoded.

Although the embodiment of the present invention has been described in detail above with reference to the drawings, a specific configuration is not limited to this embodiment, and includes a design or the like without departing from the gist of the present invention.

An encoding or decoding target may not be an image as long as a signal (data) satisfies the following (A) to (D).
(A) It is possible to generate a predictive signal (it is possible to predict another signal having autocorrelation or a high correlation).
(B) It is possible to further generate a combined predictive signal with high accuracy through linear interpolation (in units of elements) of two predictive signals.
(C) An interpolation factor vector is assumed to be sparse.
(D) A difference between a combined predictive signal and an original signal is assumed to be sparse.

Examples of the encoding or decoding target may include an acoustic signal of a multi-channel or the like, an internal signal or output signal of a neural network, and big data that is a target of multivariate analysis.

In the above-described embodiment, an example in which the predictive image acquisition device 205 is applied to image encoding and decoding is shown. However, the predictive image acquisition device 205 can be applied to low-dimensional data and high-dimensional data having a relationship of "y=Φx", that is, a relationship in which each element of the low-dimensional data is a linear sum of the high-dimensional data. For example, the predictive image acquisition device 205 can be applied for the purpose of obtaining a higher-dimensional image than the original image, that is, an image exceeding a limit of a camera element that captures the original image when the original image itself is captured as low-dimensional data.

The word "restore" described above is intended to obtain an image close to an original image, rather than an image completely equivalent to the original image, from an observation signal. The word "restore" may be restated as, for example, "reconstruct". Further, the word "element" described above may be restated as "pixel" regarding an image.

The predictive image acquisition device, the encoding device, and the decoding device in the embodiment described above may be realized by a computer. In this case, such a device may be realized by recording a program for realizing this function on a computer-readable recording medium, loading the program recorded on the recording medium into a computer system, and executing the program. The "computer system" described herein includes an operating system (OS) and hardware such as a peripheral device.

Further, the "computer-readable recording medium" refers to a portable medium such as a flexible disk, a magneto-optical disk, a ROM, or a CD-ROM, or a storage device such as a hard disk embedded into the computer system. Further, the "computer-readable recording medium" may also include a recording medium that dynamically holds a program for a short period of time, such as a communication line when the program is transmitted over a network such as the Internet or a communication line such as a telephone line or a recording medium that holds a program for a certain period of time, such as a volatile memory inside a computer system including a server and a client in such a case. Further, the program may be a program for realizing some of the above-described functions, may be a program capable of realizing the above-described functions in combination with a program previously stored in the computer system, or may be a program that is realized using a programmable logic device such as a field programmable gate array (FPGA).

INDUSTRIAL APPLICABILITY

The present invention can be applied to a system that executes transformation and inverse transformation with prediction, such as a system that encodes and decodes a signal such as an image.

REFERENCE SIGNS LIST

100 Encoding device
101 Moving image input unit
102 Compression sampling unit
103 Quantization unit
104 Entropy encoding unit
200 Decoding device
201 Encoded data input unit
202 Entropy decoding unit
203 Inverse quantization unit
204 Reference image memory
205 Predictive image acquisition device
206 Predictive image candidate generation unit
207 Predictive image selection unit
208 Factor vector generation unit
209 Predictive image combination unit
210 Compression sampling unit
211 Subtraction unit
212 Prediction residual restoration unit
213 Addition unit
300 predictive image
301 predictive image
302 Combined predictive image
303 Original image

The invention claimed is:

1. A predictive image acquisition device for associating an observation signal, the observation signal being a signal obtained from an original image serving as a decoding target image and being a lower dimensional signal than the original image, a first predictive image having a high correlation with the original image, and a second predictive image having a high correlation with the original image with each other to obtain a combined predictive image, the predictive image acquisition device comprising:
   a processor; and
   a storage medium having computer program instructions stored thereon, when executed by the processor, perform to:
   obtain an interpolation factor set for each pixel of the combined predictive image from the first predictive image, the second predictive image, and the observation signal; and combine the first predictive image and the second predictive image for each pixel using the interpolation factor to obtain the combined predictive image, wherein the pixels constituting the observation signal are expressed by a linear sum of the original image.

2. The predictive image acquisition device according to claim 1, wherein the first predictive image includes an area having a high correlation with a first area in the original image, and the second predictive image includes an area having a high correlation with a second area, the second area being a complementary area of the first area in the original image.

3. The predictive image acquisition device according to claim 1, wherein the interpolation factor is set to have high sparsity on the basis of a predetermined transformation basis.

4. The predictive image acquisition device according to claim 1, wherein the interpolation factor is a real number representing, for each pixel, which one of a pixel of the first predictive image and a pixel of the second predictive image is to be the pixel of the combined predictive image.

5. A predictive image acquisition method executed by a predictive image acquisition device for associating an observation signal, the observation signal being a signal obtained from an original image serving as a decoding target image and being a lower dimensional signal than the original image, a first predictive image having a high correlation with the original image, and a second predictive image having a high correlation with the original image with each other to obtain a combined predictive image, the predictive image acquisition method comprising: obtaining an interpolation factor set for each pixel of the combined predictive image from the first predictive image, the second predictive image, and the observation signal; and combining the first predictive image with the second predictive image for each pixel using the interpolation factor to obtain the combined predictive image, wherein the pixels constituting the observation signal are expressed by a linear sum of the original image.

6. A non-transitory computer-readable medium having computer-executable instructions that, upon execution of the instructions by a processor of a predictive image acquisition device for associating an observation signal, the observation signal being a signal obtained from an original image serving as a decoding target image and being a lower dimensional signal than the original image, a first predictive image having a high correlation with the original image, and a second predictive image having a high correlation with the original image with each other to obtain a combined predictive image, cause the predictive acquisition device to execute: a procedure of obtaining an interpolation factor set for each pixel of the combined predictive image from the first predictive image, the second predictive image, and the observation signal; and a procedure of combining the first predictive image with the second predictive image for each pixel using the interpolation factor to obtain the combined predictive image, wherein the pixels constituting the observation signal are expressed by a linear sum of the original image.

* * * * *